(12) United States Patent
Berglund et al.

(10) Patent No.: US 7,504,498 B2
(45) Date of Patent: *Mar. 17, 2009

(54) PROCESS FOR THE MANUFACTURE OF METHYL CELLULOSE ETHER

(75) Inventors: Lars Berglund, Domsjö (SE); Karl-Axel Johansson, Örnsköldsvik (SE); Kenneth Sundberg, Stenungsund (SE)

(73) Assignee: Akzo Nobel N.V. (NL)

( * ) Notice: Subject to any disclaimer, the term of this patent is extended or adjusted under 35 U.S.C. 154(b) by 543 days.

This patent is subject to a terminal disclaimer.

(21) Appl. No.: 10/497,332

(22) PCT Filed: Nov. 26, 2002

(86) PCT No.: PCT/SE02/02165

§ 371 (c)(1),
(2), (4) Date: Jun. 1, 2004

(87) PCT Pub. No.: WO03/048211

PCT Pub. Date: Jun. 12, 2003

(65) Prior Publication Data

US 2005/0176951 A1    Aug. 11, 2005

(30) Foreign Application Priority Data

Dec. 3, 2001    (SE) ................... 0104047

(51) Int. Cl.
*C08B 11/00*    (2006.01)

(52) U.S. Cl. ........................................ 536/124; 536/84
(58) Field of Classification Search ................... 536/84, 536/124
See application file for complete search history.

(56) References Cited

U.S. PATENT DOCUMENTS

| 3,342,805 A | 9/1967 | Callihan ..................... 260/232 |
| 4,117,223 A | 9/1978 | Lodige et al. ................. 536/99 |
| 4,438,264 A | 3/1984 | Balser et al. .................. 536/91 |
| 4,501,887 A | 2/1985 | Kornrumpf et al. .......... 536/84 |
| 5,013,832 A | 5/1991 | Raehse et al. ................. 536/90 |
| 5,372,642 A | 12/1994 | Bartz et al. ................. 106/730 |

FOREIGN PATENT DOCUMENTS

| GB | 162197 | | 2/1968 |
| GB | 1162197 | * | 8/1969 |
| WO | WO 00/58847 | * | 10/2000 |
| WO | WO 00/59947 | | 10/2000 |

* cited by examiner

*Primary Examiner*—Shaojia Anna Jiang
*Assistant Examiner*—Ganapathy Krishnan
(74) *Attorney, Agent, or Firm*—Ralph J. Mancini

(57) ABSTRACT

A water-soluble methyl cellulose ether, having a flocculation point below 100° C., is manufactured by reacting methyl chloride and a cellulose activated by mercerizing the cellulose with aqueous alkali in the presence of a $C_2$-$C_3$ alkyl chloride as a reaction medium at a temperature from 65° C. to 90° C. and at a pressure from 3 to 15 bar. The weight ratio between the cellulose and the $C_2$-$C_3$ alkyl chloride is normally from 1:1 to 1:5. The use of the reaction medium makes it possible to produce at a low pressure methyl cellulose ether at a good rate.

10 Claims, No Drawings

PROCESS FOR THE MANUFACTURE OF METHYL CELLULOSE ETHER

The present invention relates to a process for the manufacture of a methyl cellulose ether by performing the methylation in the presence of $C_2$-$C_3$ alkyl chloride as a reaction medium.

Methyl cellulose ethers are very common cellulose ethers and they can besides the methyl substitution also contain other substituents, for instance hydroxyethyl, hydroxypropyl and higher alkyl substituents. In general, the water-soluble methyl cellulose ethers have excellent water-retaining properties and are suitable to use for example in cement and gypsum formulations in water-based paint formulations and in wallpaper pastes. Methyl celluloses of low viscosities are also used as a protection colloid in emulsion polymerisation of vinyl chloride.

The methylation is normally performed by reacting cellulose activated with aqueous concentrated NaOH and liquid methyl chloride at a temperature of about 70° C. The vapor pressure of methyl chloride results in a reactor pressure of about 20 bar or more. During the reaction the methyl chloride also reacts with NaOH and water and forms NaCl, methanol and dimethylether. To reduce the reaction pressure and to improve the control of the methylation, the reaction can be performed in the presence of a large amount of an inert water-soluble organic reaction medium, such as acetone, alkyl-blocked polyethylene glycols, ethylene glycol diethyl ether, isopropanol, tert. butanol or dimethoxyethane or mixtures thereof. After the reaction, the reaction medium has to be removed from the methyl cellulose ether by processes that often are complex and costly, such as extraction processes. For instance, U.S. Pat. No. 4,501,887 discloses the use of an inert organic reaction medium, which is an admixture of dimethoxyethane and at least one further organic solvent selected from the group consisting of alkanol, alkane diol and alkoxy alkanol. The amount used of the admixture in the working examples for preparation of methyl cellulose ethers is in relationship to the amount of cellulose very high, which has a negative influence on the yield. Furthermore, dimethoxyethane has a boiling point of about 86° C. and forms an azeotrope with water at about 80° C.

It is an aim of the present invention to provide a method, which simplifies the methylation and other steps in the production of methyl cellulose ethers. According to the invention this can be achieved by reacting methyl chloride and cellulose activated by treatment with alkali in the presence of a reaction medium containing an alkyl chloride, where the alkyl group is ethyl and/or a propyl group, at a reaction temperature of 65-90° C. and a pressure of 3-15 bar, preferably less than 10 bar. The weight ratio between the cellulose and the reaction medium is from 1:1 to 1:5, preferably from 1:1.3 to 1:2.5. The presence of a $C_2$-$C_3$ alkyl chloride and the limited reaction temperature and low pressure makes it easy to control the methylation. Ethyl chloride and propyl chloride have a boiling point of about 12° C. and about 47° C. respectively, and they are easy to evaporate from the reaction mixture after completion of the reaction. Furthermore, the ethyl chloride and propyl chloride are inert towards methyl chloride and have a limited solubility in water. It has also been found that the methylation degree is high in comparison with the added amount of methyl chloride, which also means that the formation of by-products, such as dimethyl ether and methanol are low. Furthermore, the clarity of the aqueous solutions of methyl cellulose ethers produced is excellent.

Besides the methyl groups it is also possible according to the present invention to introduce other substituents. Example of suitable other substituents are hydroxyethyl, hydroxypropyl, hydroxybutyl, ethyl, propyl and groups containing larger hydrocarbon groups, for example substituents of the formula $RO(C_2H_4O)_nCH_2CH(OH)CH_2$—, where R is a hydrocarbon group with 4 to 24 carbon atoms and n is a number from 0 to 7. Also ionic groups, such as carboxymethyl and groups containing primary, secondary and/or tertiary amine or ammonium groups and quaternary ammonium groups can be present. Suitable reactants to introduce the groups mentioned above are ethylene oxide, propylene oxide, butylene oxide, ethyl chloride, propyl chloride,

or

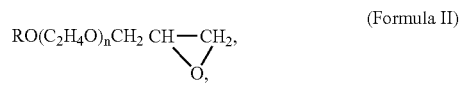

where R and n have the meanings mentioned above, 2-chloroacetic acid; 3-chloro-2-hydroxypropyl trialkylammonium chloride and glycidyl trialkylammonium chlorides, where alkyl is an alkyl with 1-22 carbon atoms with the proviso that at most one of the alkyl groups contains 1-22 carbon atoms; and the corresponding primary, secondary or tertiary ammonium and amine compounds. The reaction medium of the present invention may be used for all these reactants.

The activation of the cellulose can be achieved by mercerisation of shredded cellulose with an aqueous concentrated NaOH solution containing 40 to 55%, preferably 48 to 52%, by weight of NaOH. During the reaction NaOH is consumed by halogen-containing reactants such as methyl chloride and ethyl chloride. Normally, the amount of NaOH is between 1.0 and 5.0 moles per mole saccharide unit. The addition of the $C_2$-$C_3$ alkyl chloride can take place before the mercerisation, during the mercerisation or in direct connection with the addition of methyl chloride but preferably not after the addition of methyl chloride. The addition of $C_2$-$C_3$ alkyl chloride before mercerisation may facilitate the activation of the cellulose. The methyl chloride can be added continuously, semi-continuously or in one step. Preferably the methyl chloride is added gradually and the temperature raised to the reaction temperature of 65 to 90° C., preferably 70 to 80° C. When the temperature has reached the desired reaction temperature the remaining methyl chloride can be added at such a rate that the pressure in the reactor is maintained at a constant level.

As said above, the present invention also includes the possibility to introduce other substituents in the methyl cellulose ether. Thus, the activated cellulose may suitably be reacted with ethylene oxide and/or propylene oxide before the addition of methyl chloride, or together with methyl chloride for example in the initial phase of the addition of methyl chloride. The ethoxylation and propoxylation reaction will readily take place between 50 to 80° C. and 60 to 80° C. respectively. Even a minor molecular substitution (MS) of hydroxyethyl and/or hydroxypropyl groups often has a positive effect on the yield in the associated methylation as well as on the clarity of the methyl cellulose ether solutions. The presence of hydroxyethyl substituents also increases the flocculation temperature and balances the decreasing of flocculation temperature caused by a high substitution degree of methyl groups of the methyl cellulose ether. It may also be convenient to introduce substitution of an ethyl or propyl group. This can easily be done when the reaction with methyl chloride is nearly finalised by increasing the temperature to above 85° C., suitable to 95 to 110° C. The increased temperature accelerates the methylation and at the same time minor amounts of the reaction medium can react with the methyl cellulose ether, whereby ethyl and/or propyl substituents are also introduced. The substitution degree mainly depends on the activation of the cellulose and the temperature and reaction time. The ethyl and propyl substituents are rather hydrophobic and even a low degree of substitution of these substituents evidently reduces the flocculation temperature of the methyl cellulose. This reduction in flocculation temperature may be of importance e.g. when the methyl cellulose ether is washed with hot water. The reactant, chloro acetic acid, is normally reacted with the activated cellulose at a temperature from 45° C. to 65° C., while reactions with a 3-chloro-2-hydroxypropyl trialkylammonium compound, a glycidyl trialkylammonium compound and the corresponding primary, secondary and tertiary ammonium and amine compounds, and the reactants or formulae I and II are suitably performed at temperatures from 45° C. to 110° C., depending on the size of the reactants. The general rule is, the smaller the reactant, the lower the reaction temperature.

After completion of the reaction, the pressure is lowered and the reaction medium and other volatile components are driven off due to the heat of the reaction mixture. The obtained cellulose ether may be washed with hot water above the flocculation temperature and cleaned from water-soluble salts and by-products in a conventional manner. The solid phase can be separated by centrifugation, dried to a desired moisture content (e.g. <3%) and grounded to a desired particle size (e.g. <1 mm).

The methyl cellulose ether of the present invention has normally a $DS_{methyl}$ between 0.6 and 2.5, preferably between 1.0 and 2.0, a $DS_{ethyl}$ between 0 and 0.8, a $DS_{propyl}$ between 0 and 0.2, a $DS_{carboxymethyl}$ between 0 and 0.2, a $DS_{ammonium}$ or amine containing substituents between 0 and 1.0, a $DS_{RO(C2H4O)nCH2CH(OH)CH2}$, where R and n have the meaning mentioned above, between 0 and 0.5, a $MS_{hydroxyethyl}$ between 0 and 1.6 and a $MS_{hydroxypropyl}$ between 0 and 0.9 and a $MS_{hydroxybutyl}$ between 0 and 0.3. A methyl cellulose ether having no other types of substituents than methyl has suitably a $DS_{metyl}$ between 1.0 and 2.0, preferably from 1.2 to 1.8. Examples of mixed cellulose ethers are a methyl hydroxyethyl cellulose ether having a $DS_{metyl}$ from 1.2 to 2.0 and a $MS_{hydroxyethyl}$ from 0.05 to 1.3, preferably from 0.1 to 0.7; a methyl hydroxypropyl cellulose ether having a $DS_{methyl}$ from 1.0 to 2.0 and a $MS_{hydroxypropyl}$ from 0.1 to 1.0; a methyl ethyl hydroxyethyl cellulose ether having a $DS_{methyl}$ from 1.0 to 2.0, a $DS_{ethyl}$ from 0.1 to 0.6 and a $MS_{hydroxyethyl}$ from 0.05 to 1.0; and a carboxymethyl cellulose ether having a $DS_{methyl}$ from 1.0 to 2.0 and a $DS_{carboxymethyl}$ from 0.05 to 0.2.

The present invention is further illustrated by the following Examples.

EXAMPLE 1

In a reactor having a volume of 130 liter, 5.0 kg of milled cotton linter was added, whereupon the gas phase of the reactor was evacuated to 0.05 bar and filled with nitrogen gas. The evacuation and refill with nitrogen gas was repeated once and finally the reactor was evacuated to 0.05 bar. At room temperature, 7.5 kg of ethyl chloride was then added to the reactor during stirring and the mixture obtained was sprayed with 6.17 kg of a water solution containing 50% by weight of NaOH (2.5 mol) to transfer the cellulose to alkali cellulose. During the mercerisation the temperature raised to about 30° C. After 15 minutes of mercerisation 0.27 kg of ethylene oxide (0.2 mol) was added followed by an addition of 1.56 kg methyl chloride (1.0 mol).

The temperature was then gradually increased up to 75° C. during 30 minutes, after which ethylene oxide and the essential part of methyl chloride had reacted. Thereupon, at 75° C., an additional amount of 1.95 kg methyl chloride (1.25 mol) was continuously introduced into the reactor in such a rate that the reactor pressure was kept on 8.5 bar. Without the presence of ethyl chloride the reaction pressure would have been above 19 bar.

After the addition of all methyl chloride the temperature was further increased to 100° C. and a final reaction between ethyl chloride and remaining alkali was performed. The presence of ethyl groups in the cellulose ether leads to a decrease in the flocculation temperature and to improved dewatering ability.

After the reaction was completed the volatile components (including the reaction medium) were driven off and the rest of the reaction product was washed by hot water about 95° C. to remove the salt formed during the reaction. The solid phase was separated by centrifugation and dried to a moisture content of less than 3% by weight. Finally the cellulose ether was milled to a particle size less than 1 mm.

The cellulose ether was analysed with regard to its MS/DS: methyl, ethyl and hydroxyethyl substitution by gas chromatography after cleavage by hydrogen bromide. The flocculation temperature was determined by use of a spectrophotometer under a continuous temperature increase. The viscosity was measured by a Brookfield viscometer, type LV, at a temperature of 20° C. in a 1% buffered solution at pH 7.0, while the clarity was measured by light transmission in comparison with water at 20° C.

The degree of substitution of the different substituents and the properties of cellulose ether are shown in the Table I below.

EXAMPLE 2

A cellulose ether was produced in a process similar to the one described in Example 1, but with the differences that 7.41 kg of the water solution containing 50% by weight of NaOH (3 mol), 1.36 kg ethylene oxide and 2.34 kg methyl chloride (1.5 mol continuously) were added. The degree of substitutions and the properties of the cellulose ether obtained are shown in Table I below.

EXAMPLE 3

A cellulose ether was produced in a process similar to the one described in Example 1, but with the difference that 1.56 kg of methyl chloride was continuously added. The degree of substitutions and the properties of the cellulose ether obtained are shown in Table I below.

EXAMPLE 4

A cellulose ether was produced in a process similar to the one described in Example 1, but with the differences that no ethylation was carried out and that 7.41 kg of the water solution containing 50% by weight of NaOH (3 mol) and 3.12 kg of methyl chloride (2 mol) in the continuous step were added. The degree of substitutions and the properties of the celulose ether obtained are shown in Table I below.

EXAMPLE 5

A cellulose ether was produced in a process similar to the one described in Example 3, but with the difference that no ethylene oxide was added. The degree of substitution and the properties of the cellulose ether obtained are shown in Table I below.

EXAMPLE 6

A methyl cellulose ether was produced by a process similar to the one disclosed in Example 1 by adding 2.34 kg methyl chloride (1.5 mol, continuously). No addition of ethylene oxide was made and no increase of the temperature to 100° C. was performed. The degree of substitution and the properties of the cellulose ether obtained are shown in Table I below.

EXAMPLE 7

In a reactor having a volume of 130 liter 5.0 kg of milled cotton linter was added, whereupon the gas phase of the reactor was evacuated to 0.05 bar and filled with nitrogen gas. The evacuation and refill with nitrogen gas were repeated once. After evacuation to 0.05 bar, 7.5 kg of ethyl chloride and 4.94 kg of a water solution containing 50% by weight of NaOH (2 mol) were added into the reactor during stirring at room temperature. After 15 minutes of mercerisation at 30° C., 1.36 kg of ethylene oxide (1 mol) was charged and the temperature was increased to 60° C., whereupon 1.36 kg ethylene oxide (1 mol) was continuously introduced during stirring for 20 minutes. The temperature was then kept for 10 minutes at 60° C., and the temperature was then raised to 75° C. followed by the addition of 2.34 kg methyl chloride in such a rate that the reactor pressure was 8.5 bar. After the addition of all methyl chloride the temperature was raised to 100° C. and ethyl chloride was allowed to react with remaining NaOH. After completion of the ethylation the reactor content was worked up as described in Example 1 and the cellulose ether analysed accordingly. The results are shown in Table I below.

From the results it is evident that methyl cellulose ether with different types of substitutions can be produced according to the invention at a low reaction pressure and low amounts of the reaction medium. The cellulose ethers have good clarity and clarities above 90% are excellent. Further, the yield of methyl chloride is high in comparison with the results obtained in U.S. Pat. No. 4,501,887.

The invention claimed is:

1. A process for the manufacture of a water-soluble methyl cellulose ether, having a flocculation point below 100° C. which comprises reacting methyl chloride and a cellulose activated by mercerising the cellulose with aqueous alkali, wherein the reaction is performed in the presence of a $C_2$-$C_3$ alkyl chloride as a reaction medium at a reaction temperature from 65° C. to 90° C. and at a pressure from 3 to 15 bar.

2. The process of claim 1, wherein the weight ratio between the cellulose and the $C_2$-$C_3$ alkyl chloride is from 1:1 to 1:5.

3. The process of claim 1, wherein the weight ratio between the cellulose and the $C_2$-$C_3$ alkyl chloride is from 1:1.3 to 1:2.5 and the pressure below 10 bar.

4. The process of claim 1 wherein the $C_2$-$C_3$ alkyl chloride is added to the cellulose before the activation of the cellulose and/or during the mercerisation of the cellulose.

5. The process of claim 1 wherein a portion of the methyl chloride is added while the temperature is raised to the reaction temperature, whereupon the remaining methyl chloride is added in such a rate that the temperature and the reactor pressure is maintained.

6. The process of claim 1 wherein the methyl chloride is added in an amount from 0.9 to 4.9 moles per mole saccharide unit of the cellulose.

7. The process of claim 1 wherein the activated cellulose is reacted with ethylene oxide and/or propylene oxide at a temperature from 50° C. to 80° C. and 60° C. to 80° C. respectively before the addition of methyl chloride and/or together with methyl chloride.

8. The process of claim 1 of wherein the activated cellulose is also reacted with reactants chosen from the group consist

TABLE I

| | Example | | | | | | |
|---|---|---|---|---|---|---|---|
| | 1 | 2 | 3 | 4 | 5 | 6 | 7 |
| Additions mole su[1] | | | | | | | |
| NaOH | 2.5 | 3.0 | 2.5 | 3.0 | 2.5 | 2.5 | 2.0 |
| Ethylene oxide | 0.2 | 1.0 | 0.2 | 0.2 | — | — | 1.0 + 1.0 |
| Methyl chloride | 1.0 + 1.25 | 1.0 + 1.5 | 1.0 + 1.0 | 1.0 + 2.0 | 1.0 + 1.0 | 1.0 + 1.5 | 1.5 |
| Substitutions | | | | | | | |
| DS ethyl | 0.15 | 0.25 | 0.25 | — | 0.3 | — | 0.25 |
| MS hydroxyethyl | 0.12 | 0.60 | 0.12 | 0.12 | — | — | 1.20 |
| DS methyl | 1.3 | 1.5 | 1.2 | 1.7 | 1.2 | 1.35 | 0.85 |
| Properties | | | | | | | |
| Viscosity, mPa · s | 12200 | 8830 | 8350 | 15900 | 14600 | 8900 | 5730 |
| Clarity, % | 92.6 | 95.9 | 88.4 | 90.4 | 77.5 | 81.2 | 96.1 |
| Flocculation, ° C. | 67.6 | 67.9 | 66.4 | 64.6 | 65.8 | 67.3 | 72.1 |

[1]su = saccharide unit ing ethyl chloride; propyl chloride; butylene oxide; 2-chloro acetic acid; $RO(C_2H_4O)_nCH_2CH(OH)CH_2Cl$ and

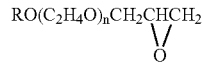

where R is a hydrocarbon having 4 to 22 carbon atoms and n is a number from 0 to 7; 3-chloro-2-hydroxypropyl trialkylammonium chloride and glycidyl trialkylammonium chloride where alkyl is an alkyl with 1 to 22 carbon atoms with the proviso that at most one of the alkyl groups have more than 2 carbon atoms; and the corresponding primary, secondary or tertiary ammonium and amine compounds.

9. The process of claim 1 wherein methyl chloride and the other etherifying reactants are added in such amounts that a methyl cellulose ether is obtained having a $DS_{methyl}$ from 0.6 to 2.5, a $DS_{ethyl}$ from 0 to 0.8, a $DS_{propyl}$ from 0 to 0.2, a $DS_{carboxymethyl}$ from 0 to 0.2, a $DS_{ammonium\ containing\ substituents}$ from 0 to 1.0, $DS_{RO(C2H4O)n\ CH2CH(OH)CH2}$, where R and n have the meanings mentioned above from 0 to 0.3, a $MS_{hydroxyethyl}$ from 0 to 1.6, a MS hydroxypropyl from 0 to 0.9 and a MS hydroxybutyl from 0 to 0.3.

10. The process of claim 9, wherein the methyl cellulose produced is a methyl cellulose having a DS methyl from 1.0 to 2.0; a methyl hydroxyethyl cellulose having a $DS_{methyl}$ from 1.2 to 2.0 and a $MS_{hydroxyethyl}$ from 0.05 to 1.2; a methyl hydroxypropyl cellulose having a $DS_{methyl}$ from 1.0 to 2.0 and a $MS_{hydroxypropyl}$ from 0.1 to 1.0; a methyl ethyl hydroxyethyl cellulose having a $DS_{methyl}$ from 1.0 to 2.0, a $DS_{ethyl}$ from 0.1 to 0.6 and a $MS_{hydroxyethyl}$ from 0.05 to 1.2; and a methyl carboxymethyl cellulose having a $DS_{methyl}$ from 1.0 to 2.0 and a $DS_{carboxymethyl}$ from 0.05 to 0.2.

* * * * *